Figure 1:
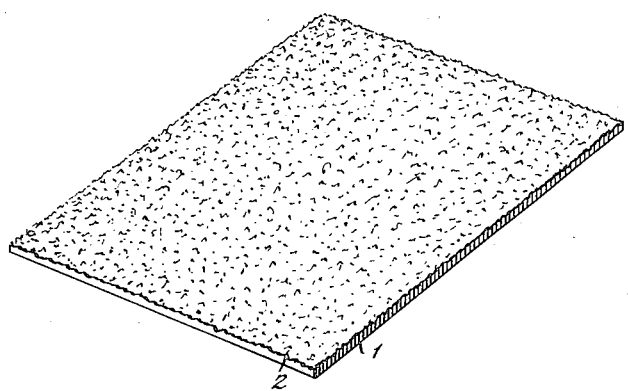

March 4, 1924.

E. ZUNDEL

GLASS MOSAIC

Filed April 9, 1923

1,485,753

WITNESSES

Edw. Thorpe.
Robert J. Hulsizer.

INVENTOR
Emil Zundel

BY
Munn & Co.
ATTORNEYS

Patented Mar. 4, 1924.

1,485,753

UNITED STATES PATENT OFFICE.

EMIL ZUNDEL, OF NEW YORK, N. Y.

GLASS MOSAIC.

Application filed April 9, 1923. Serial No. 630,916.

*To all whom it may concern:*

Be it known that I, EMIL ZUNDEL, a citizen of the United States, and a resident of the city of New York, borough of Queens, in the county of Queens and State of New York, have invented a new and Improved Glass Mosaic, of which the following is a full, clear, and exact description.

This invention relates to a glass mosaic and a back facing therefor.

An object of the invention is to produce a glass mosaic with a back facing which will enable it to be seated on a cementitious base and not become gradually loosened as has generally been the case.

It has been found that in preparing thin glass mosaics, especially in the form of rather sizable plates and in very small pieces of mosaic, that the smooth rear surface of the glass did not tend to increase its liability to remain firmly fixed to the concrete or cementitious base against which it was placed, consequently, in due course of time the glass mosaic, and especially the larger sizes, would drop out and be broken.

In order to overcome this defective feature, I have provided a composition which can be very easily prepared and applied to the rear surface of the mosaic and burned therein at the same time that the front surface colors are burned in. This composition when so burned forms a rough back face on the mosaic which causes it more intimately to unite with the cementitious foundation and prevent the liability for the mosaic to drop out of place.

In general the process comprises mixing several ingredients together to form a powder, painting the back surface of the mosaic with some adhesive material such as varnish or shellac, and then dusting this powder on to the back surface. The mosaic can then be put in a kiln and the front and rear surface coatings burned in at the same time, thus enabling the usual colors and designs to be burned on to the front surface at the same time that the back facing is burned in.

As a preferred form of composition, I wish to refer to the use of sand, glass, flux and whiting. Preferably, I use the ingredients in the following proportions: one pound each of sand, glass and flux and one ounce of whiting. These ingredients are mixed, the glass being either powdered glass or crystal glass, which can be broken up. The composition is in the form of a dry powder which can be stored in containers. When it is desired to treat the mosaic, the back surface is treated with varnish, shellac or other binder material and the powder dusted thereon. It is then put in the furnace and the coating burned in.

One form of my invention is illustrated in the drawings, of which—

Figure 2:
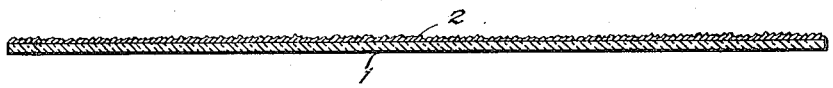

Figure 1 is a perspective of a thin glass mosaic with a rough rear facing applied thereto; and Figure 2 is a section taken through the mosaic.

The mosaic is represented by the numeral 1, and the rough back by the numeral 2.

This invention, therefore, concerns the provision of a glass mosaic having a roughened back surface to effect a more efficient union with the concrete or cement against which it is placed, and to provide a simple and efficient composition which can be used for the back facing and be burned on to the surface of the mosaic.

What I claim is:

1. A glass mosaic having a roughened rear surface formed by burning thereinto a composition of glass, sand, flux and whiting.

2. A glass mosaic which has a roughened rear surface formed by burning thereinto a composition of matter made in the following proportions: one pound of sand, one pound of flux, one pound of glass, and one ounce of whiting.

EMIL ZUNDEL.